2,750,298

SOLUTION OF RESIN IN BLOWN OIL TREATED WITH FRIEDEL-CRAFTS CATALYST TO PRODUCE VARNISH

Myron W. Kiebler, Jr., Cleveland, and Everett B. Euchner, Avon Lake, Ohio, assignors to The Glidden Company, Cleveland, Ohio, a corporation of Ohio No Drawing. Application April 10, 1952,
Serial No. 281,672

10 Claims. (Cl. 106—222)

This invention relates to new varnish compositions arising from the catalytic treatment of resins and blown oils, and relates also to processes for preparing such varnishes.

It is now known that varnishes can be made by the treatment of resins and a restricted class of glyceride oils with a complex of boron trifluoride and an organic compound. Methods for preparing such varnishes are described and claimed in the United States Patent No. 2,550,961 of J. G. Bradley, Jr. While useful products are possible through the practices there described, a serious limitation exists therein in that an appreciable percentage of the total unsaturation of the oils must be in the conjugated state. The most common oils used in the varnish industry which meet this specification are China-wood oil (tung oil), oiticica oil, and to a certain degree, dehydrated castor oil. In the past, these materials have tended to be higher in price than non-conjugated oils such as soyabean oil, linseed oil, safflower oil, etc., and in periods of international unrest, the conjugated oils have often been in short supply, high in price, and subject to government allocation or control.

It is also known that blown oils show a special reactivity toward certain catalysts not exhibited by the original oil. The use of boron trifluoride as a catalyst for such oils is described in the United States patent of Konen and Clocker, No. 2,547,760, while the copending application of Kiebler et al., Serial No. 253,-463, filed October 26, 1951, describes the use of fluoboric acid catalysts. We have now found that useful varnishes can be produced by the treatment of resin and blown oil mixtures with certain acid-reacting catalysts.

Heretofore blown oils have had only a very limited use in varnishes, one reason being that serious darkening takes place when the blown oils are heated in excess of the normal temperature of blowing (180–250° F.). Moreover, even if color is not important, as is often true, it is very difficult to make a varnish with a blown oil because of the extreme foaming which takes place when such oils are heated to the temperatures used in conventional varnish-making practice. For these and other reasons, our discovery of a method of making air-drying or heat-convertible types of film-forming products with blown oils represents a valuable contribution to the varnish maker's art. Moreover, an economic advantage can be realized by the practice of our invention because blown oils are generally of lower cost than the conjugated oils and because our process employs temperatures which are relatively low with respect to usual varnish practice. The expense and time involved in heating and cooling the oil and resin in normal varnish practice can be largely eliminated as can the danger associated with adding solvent to a hot varnish. Methods are disclosed hereafter whereby our invention can be practiced to utilize materials which are available in large quantities at a very low cost to yield high quality products.

Accordingly, the primary object of this invention is to provide a new varnish resulting from the catalytic treatment of mixtures of resins with blown oils. A further object is to provide a process for the catalytic treatment of such mixtures at relatively low temperatures to produce varnishes. A further object is to provide a new process for improving the solvent resistance of baked films of certain of our varnishes. Another object is to provide processes adapted to employ various resins which are characterized by their unsaturation and low cost. Yet another object is to provide the varnish art with a new class of varnishes.

Other objects will be apparent from the following description of the invention.

By the term "varnish" we mean an oil-resin combination which when applied in a thin layer is capable of forming a solid film either through oxidation, solvent evaporation, polymerization or some combination of these processes. The term "resin" is intended to mean a non-vegetable oil, solids-contributing, constituent of a varnish composition.

The art of varnish making has been developed over hundreds of years. Suitable resins have been found or developed which gave desirable results consistent with contemporary practice. By trial-and-error methods, the skilled varnish maker has built up a backlog of knowledge enabling him to draw on his experience to produce a varnish which is generally suitable for the problem at hand. For example, he knows that a mixture of tung and linseed oils cooked with limed rosin will yield a low-cost varnish having a high acid number, which varnish will be reactive with many pigments and will have poor water resistance. He further knows from experience that the use of a resin made by reacting rosin or the maleic adduct of rosin with glycerine or pentaerythritol will increase the cost of a varnish but will also contribute compensating properties such as lower reactivity to pigments, improved water resistance, etc. Such backlog of knowledge on the part of one practicing the present invention can be drawn on to some degree to guide his selection of the oils which when blown are to be used in his formulations. Any of the drying or semi-drying oils can be used individually or in mixture, but of course the suitability for the intended end product and the reactivity with the resin in the presence of the catalyst will vary with the oil and with the extent to which the oil has been blown. In general, the oil should be blown sufficiently to manifest at least some degree of the characteristics associated with blown oils. We prefer, however, to blow them to an extent corresponding at least to that of tung oil blown to a Gardner-Holdt viscosity of M, while best results are usually found when the blown oil has a viscosity of X or greater, up to a viscosity of Z6.

Many resins were originally of little or no value in varnish practice until the varnish maker learned to use them. For example, the phenolic resins which were markedly different from the natural or fossil resins were poorly received when first introduced. These resins are now accepted as valuable varnish-making resins and are known to contribute desirable properties to varnishes. In this sense the list of resins suitable for use in our invention is apt to grow longer as new resins are found by research. To the best of our present knowledge, any oil-soluble varnish-maker's resin can be used in practicing this invention. These include the oil-soluble natural and so-called fossil resins such as the dammars, the East Indias, the copals, the pine resins (e. g. rosin, stabilized rosin, hydrogenated rosin, disproportionated rosin, polymerized rosin and esters of such rosins, and terpene resins such as are prepared by polymerization of alpha and/or beta pinene), the oil-soluble synthetic resins such as the cumars, phenolic resins, rosin-modified phenolic resins, rosin-modified maleic resins, and the oil-miscible alkyd resins; and the petroleum and other hydrocarbon resins such as clay tower polymers and like materials obtained in the refining of petroleum or in the treatment of oil-shales, bituminous coal, etc. The selection of the resin or combination of resins which is to be used with a selected blown oil can readily be made by the experienced formulator.

The treatment of a selected blown oil or mixture of blown oils with selected resin(s) involves treating the mass in admixture with a small amount of one or more of the catalysts mentioned below at temperatures between room temperature and the temperatures used in preparing the blown oils (180°–250° F.). Higher temperatures are apt to lead to decomposition of the blown oils. For most purposes, however, temperatures below about 212° F. are very satisfactory. Solvents can be present during the catalytic treatment, provided the solvent is a satisfactory medium for the dissolution or dispersion of the ingredients or is instrumental in bringing about the formation of a substantially homogeneous product at the conclusion of the catalyst treatment. The amount of solvent so used may vary widely, being to our present knowledge uncritical so far as its effects on attainment of the objectives of the invention are concerned. Solvents need not be used in the treatment when the blown oil(s) and resin(s) are miscible without them, but a small amount of solvent may be introduced with the catalyst simply to facilitate dissolution and/or dispersion of the catalyst through the mass of material undergoing treatment.

The amount of catalyst may be varied considerably depending upon the character of the oil, the nature of the resin, the ratio of resin to oil, the amount of solvent, if any, the temperature, the activity of the catalyst, the polymerization rate desired, and the relative freedom of the particular mass being treated from catalyst poisons or catalyst-inactivating components therein. In some instances, the threshold amount of catalyst depends on first introducing enough of the catalyst to offset any catalyst-poisons or catalyst-inactivating materials in the mass to which the catalyst is added. After such an amount has been introduced, further additions provide active catalyst in the mass. Where a different catalyst is used on the same mass, the materials which inactivated the previous catalyst may have no effect on the new one and a lower threshold value is effective. Thus the minimum concentration of catalyst which is effective for our intended purposes is dependent on factors which cannot readily be expressed in terms of a numerical value on the minimum effective amount of catalyst. As to the maximum amount, we have found that 5% is satisfactory but is seldom needed, amounts between about 0.25% and 4% by weight of the resin in the mass being generally adequate.

Such compounds as aluminum chloride, boron trifluoride and stannic chloride are contemplated as catalysts for the practice of this invention. Other amphoteric metal halide catalysts and Friedel-Crafts catalysts can also be used. Examples are wellknown and are adequately described in the patent and chemical literature. Reference is made particularly to "The Friedel-Crafts Synthesis," Chemical Reviews, XVII No. 3, P327 (1935). However, we prefer to use fluoboric acid, aluminum chloride or the diethyl ether or phenol complexes or boron trifluoride because of their reactivity, cheapness and ease of handling.

After a selected mass of blown oil and resin has been treated with catalyst, or whenever one desires to terminate the treatment, the catalyst can be inactivated in any of numerous ways, as by washing the treated mass with water, by adding basic compounds either organic or inorganic, including basic pigments, fillers or extenders, or by adding alkalies. However, it is not always necessary or desirable to neutralize the catalyst since, as the following examples demonstrate, variations in film properties can be obtained merely by neutralizing or not neutralizing the catalyst.

Variations in varnish properties can also be obtained by other variations in procedure. For example, the viscosity of short oil length varnishes can often be increased by withholding resin from the initial batch and adding the resin in increments as the catalytic treatment progresses. Other variations are illustrated or suggested by the following examples and are available for use at the discretion and choice of the operator.

Some of the advantages and principles of the invention are illustrated in the following Examples I, II, III and IV wherein two different methods of treating the same mixture of ingredients are compared with two embodiments of our invention.

EXAMPLE I

A petroleum resin (clay tower polymer) of the type described in the Chittick U. S. Patent No. 1,891,079 and commercially available under the name Amsco Petropon 1158 has the following physical and chemical analysis:

| | |
|---|---:|
| Specific gravity 60/60° F | 0.95–0.96 |
| A. P. I. gravity, 60° F | 15.5 |
| Flash, C. O. C., °F. min | 175 |
| Fire, C. O. C., °F., min | 215 |
| Viscosity: | |
| S. U. at 100° F | 250 |
| S. U. at 210° F | 48.1 |
| Viscosity, Gardner-Holdt, 77° F., poises | 0.86 |
| Pour, A. S. T. M., °F | 0 |
| Solid content (A. S. T. M. D154–28) | 65 |
| Av. molecular weight | 300 |
| Iodine number (Wijs modified) minimum | 190 |
| Acid number | 0 |
| Saponification number (maximum) | 1.0 |

Three thousand grams of the above resin was mixed with 1000 grams of blown linseed having a $Z_3$ body. These proportions correspond to a 4-gallon oil length varnish. The viscosity of the mixture as measured with a No. 4 Ford cup was one minute and 36 seconds at 82° F., and 41 seconds at 125° F. Thirty grams of the diethyl ether complex of boron trifluoride, containing 14.4 grams of boron trifluoride, was added to the mixture, and the whole mass was warmed. The viscosity of the mass increased as indicated in the following data:

| Time | Temperature, °F. | Viscosity (No. 4 Ford Cup) |
|---|---|---|
| 0 | 85 | 1 minute, 36 seconds. |
| 2 hours, 15 minutes | 116 | Do. |
| 4 hours, 15 minutes | 122 | 1 minute, 38 seconds. |
| 5 hours, 15 minutes | 124 (heat off) | |
| 24 hours | 85 | 4 minutes, 5 seconds. |

EXAMPLE II

A mixture of 750 grams of the petroleum resin described in Example I and 250 grams of blown linseed ($Z_3$ body) was heated with agitation between 450° and 500° F. for about five hours. The mixture, after being cooled to 80° F., had a No. 4 Ford cup viscosity of one minute and 46 seconds. The material was reheated and held at 520° F. to 530° F. for 7 hours. After cooling, the product had a viscosity of 5 minutes and 15 seconds at 79° F. The treatment was conducted in equipment fitted with a reflux condenser to prevent the loss of volatile matter.

EXAMPLE III

The product from Example I was divided and sufficient potassium hydroxide stoichiometrically equivalent to the catalyst was added to one part to neutralize the catalyst.

EXAMPLE IV

A mixture of 25% blown linseed and 75% of the petroleum resin described in Example I was prepared by simply mixing the materials together without further treatment.

Iron naphthenate drier was added to sample portions of the products of Examples I, II, III and IV at the rate of 0.0236 pound of iron per gallon and the varnishes were thinned with mineral spirits, poured out in a series on the same steel panel, and baked for 10 minutes at 400° F. When hot, Nos. I and III showed the best cure. No. IV was softer, and No. II showed the poorest cure. When cool, No. III showed the best film with No. I very slightly poorer. No. IV was brittle and No. II was the poorest, being very brittle. This experiment clearly indicates that the varnish made with a catalyst is markedly different from a varnish of the same composition prepared by thermal treatment of the mixture or from a physical mixture of the ingredients.

A still more striking difference can be found in the solvent resistance of the four films. A rough cloth was moistened with gasoline and rubbed against the film. Film No. II was destroyed after only two strokes, No. IV failed after four strokes, No. I failed after ten strokes, and film No. III withstood 40 strokes before failure. Thus it is clearly evident that neutralization of the catalyst prior to baking improved the solvent resistance of the baked varnish film.

The product of Example I after addition of conventional amounts of lead, cobalt, and manganese drier would air dry. The experienced worker will recognize that the products of this series have a lower viscosity than the usual solvent-thinned varnishes; however, these materials were prepared for application at a high solids content or in the form of emulsions for such end uses as special coatings or as binders for molding sands, glass and mineral fibers and hard board.

Many low cost petroleum materials other than Petropon 1158 are available as by-products of the petroleum industry. The following few, with their properties, are given as examples:

|  | Amsco Petropon 2138 | Amsco Petropon 10X |
| --- | --- | --- |
| Specific gravity 60°/60° F | 0.99 | 0.91 |
| A.P.I. gravity, approximately | 11 | 24.1 |
| Flash, C.O.C., °F., Minimum | 230 | 170 |
| Fire, C.O.C., °F., Minimum | 280 | 210 |
| Viscosity: | | |
| S. U. at 100° F | | 93 |
| S. U. at 210° F | 365 | |
| Gardner-Holdt, 130° F., poises | 20.95 | |
| Pour, A.S.T.M., °F | 45 | 0 |
| Non-volatile (A.S.T.M. D-154-47), percent | 90 | 55 |
| Average molecular weight | 390 | 270 |
| Iodine number (Wijs modified), Min | 200 | 275 |
| Acid number | 1.5 | 1.5 |
| Saponification number, maximum | 1 | 1.0 |

Petropon 2138 and the C. T. L. A. polymer described hereafter in this specification are clay tower polymers. It is known that somewhat similar products can be prepared by polymerizing refinery gas streams having a high ethylene content with aluminum chloride. Amsco Petropon 10X is an example of such material and consists of hydrocarbons of medium to high molecular weight composed mainly of cyclic olefinic structures having an average of more than two double bonds per molecule. A substantial portion of the double bonds is arranged in the conjugated diene system. Petropon 10X is produced by the polymerization of ethylene at controlled conditions of temperature and pressure with the aid of aluminum chloride catalyst dissolved in a chlorinated hydrocarbon solvent. Subsequent refining consists of flashing off the lighter solvent, hydrolyzing the excess catalyst and separating the water layer. Other resins are obtained by cracking petroleum to yield mixtures of polymers. The unreacted oils are often stripped from the polymeric resin by vacuum and steam. Such products are condensed polynuclear aromatic ring type resins. The Transphalts and Aromatic Plasticizers marketed by Pennsylvania Industrial Chemical Corporation, Clairton, Pennsylvania, are examples of this latter class of materials.

|  | Transphalt L-4 | Transphalt 25 | Aromatic Plasticizer 25 |
| --- | --- | --- | --- |
| Form | liquid | plastic | plastic. |
| Flash, C.O.C. °F | 285 | 355 | |
| Specific gravity | 1.05 | 1.06 | 0.945. |
| Viscosity at 210° F., S. U | 50.4 | 98.5 | |
| Iodine number | | | 53. |
| Melting point, ball and ring, °C | | 25 | 25. |

The invention is not limited to the preparation of varnishes of short oil lengths or low viscosities, as the following examples demonstrate:

EXAMPLE V

The following materials were mixed together:

|  | Grams |
| --- | --- |
| Petropon 1158 | 750 |
| Blown linseed, $Z_3$ body | 750 |
| Mineral spirits | 645 | and 30 grams of the diethyl ether complex of boron trifluoride, equivalent to 14.4 grams of boron trifluoride and to 2% of the complex on the solids was added to the mixture with constant agitation at 80 F. The initial viscosity in a No. 4 Ford cup was 26 seconds. After 1.75 hours the temperature of the mass had increased to 93° and the viscosity had increased to two minutes and twenty-four seconds. This preparation was conducted at 70% solids and represents a 12½ gallon oil length varnish.

EXAMPLE VI

A twenty-gallon oil length varnish was made of the following ingredients:

|  | Grams |
| --- | --- |
| Petropon 1158 | 500 |
| Blown linseed, $Z_3$ body | 827 |
| Mineral spirits | 575 |

Treatment of this composition with 2% of the diethyl ether complex of boron trifluoride by weight on the solids, increased the temperature to 99° F. from an initial temperature of 78° F., and increased the viscosity from an initial viscosity of 35 seconds to the point of gelation in 20 minutes. Such gelled systems can often be liquefied by the addition of alkali and in this case the addition of 15.8 grams of potassium hydroxide reduced the viscosity to 2 minutes and 30 seconds. This viscosity was maintained for at least three days.

As indicated previously the practice of this invention is in no way limited to the use of petroleum products as resin constituents in the new varnishes. The following examples demonstrate the successful use of such diverse material as rosin, terpene resins, ester gums, phenolic resins and fossil gums.

EXAMPLE VII

Blown linseed oil, $Z_3$ body _____ 400 grams (76%)
Gum rosin _____ 127 grams (24%)
Mineral spirits _____ 225 grams The above ingredients, when mixed together, had an initial viscosity of J on the Gardner-Holdt scale. Following the addition of 1.70 grams of a 43% aqueous solution of fluoboric acid with constant agitation, the viscosity of the system increased to a value of $Z_4$ in 6.5 hours. The temperature of the batch varied from 80 to 85° F. The reaction was stopped by the addition of a methanol solution of potassium hydroxide containing the latter in an amount equivalent stoichiometrically to the catalyst. The final color was 4 (Hellige).

EXAMPLE VIII

*20-gallon oil length varnish*

Ester gum _____ 190 grams (38%).
Blown linseed oil, $Z_3$ body _____ 310 grams (62%).
Mineral spirits _____ 215 grams.

The mixture had an initial viscosity of J at 78° F. Thirty minutes after the addition of 5 grams of the diethyl ether complex of boron trifluoride (2.4 grams boron trifluoride) the temperature was 98° F. and the viscosity was Z. The process was stopped by the addition of alkali. The final color was 7L. At 50% solids in mineral spirits the varnish had a viscosity of E (Gardner-Holdt).

EXAMPLE IX

*20-gallon oil length varnish*

| | Grams |
|---|---|
| Modified phenolic resin, Amberol BX 1 | 190 |
| Blown linseed oil, $Z_3$ body | 310 |
| Mineral spirits | 330 |

The varnish mixture went from an initial viscosity of J (Gardner-Holdt) to a value of X in one hour and 15 minutes after the addition of five grams of the phenol complex of boron trifluoride (1.3 grams of boron trifluoride). The temperature of the mixture increased from 80 to 87° F. The color of the solution lightened slightly when the catalyst was neutralized with alkali to give a final color of 4–5L.

EXAMPLE X

*4 gallon oil length varnish*

| | Grams |
|---|---|
| Ester gum | 300 |
| Blown linseed oil, $Z_3$ body | 100 |
| Mineral spirits | 171 |

The mixture, having an initial viscosity of K, was treated with 12 grams of the diethyl ether complex of boron trifluoride (5.75 grams of boron trifluoride) to give a product of T viscosity in two hours. Heat was applied during the first 15 minutes to increase the temperature to 106° F. after which the varnish was allowed to cool to a final value of 83°. The reaction was terminated by washing with water and separating the two phases.

EXAMPLE XI

*40 gallon oil length varnish*

A by-product composition obtained in the naval stores industry containing pinenes and various terpene monocyclic compounds including dipentene, alpha terpinene, terpinolene, etc., was heated with fuller's earth until exothermic polymerization of part of the mixture took place. After further heating for several hours, the catalyst was filtered off and the filtrate was steam stripped to remove unpolymerized materials such as cymene, camphene and other unreacted monocyclic terpenes. The fluid residue was a terpene polymer having the following analysis:

| | |
|---|---|
| Refractive index at 20° C | 1.5150 |
| Viscosity at 25° C _____ centipoises | 200 |
| Acid number | Neutral |
| Specific gravity, 15.5°/15.5° C | 0.943 |
| Flash point _____° F | 240 |
| Distillation (ASTM D20–30): | |
| I. B. P. _____° C | 174 |
| 5% _____° C | 285 |
| 50% _____° C | 316 |
| 95% _____° C | 336 |

A mixture of 96 grams of the terpene polymer, 310 grams of blown linseed oil ($Z_3$ body) and 172 grams of mineral spirits was mixed and treated with 0.5 gram of a 43% aqueous solution of fluoboric acid diluted to 4 grams with methoxy-ethanol. The following data were obtained:

| Time | Temperature, ° F. | Viscosity | Remarks |
|---|---|---|---|
| 0 | 72 | F | Added catalyst. |
| 0.5 | 78 | L | |
| 1.0 | 79 | R–S | |
| 1.5 | 80 | X | Heated |
| 2.5 | 125 | $>Z_2$ | Alkali added. |
| Final viscosity | | $Z_4$ | |

The varnish prepared as outlined in this example would air dry with conventional driers. In a separate experiment a sample of the same blown linseed oil as used in this example was polymerized to a $Z_3$ body (at 70% solids) with fluoboric acid and was blended with the terpene polymer to give the same resin-oil ratio as the varnish of this example. Samples of the polymerized oil, polymerized oil mixed with the terpene polymer, and the varnish of this example were diluted and mixed with conventional amounts of cobalt, lead, and manganese drier. Films were poured on the same steel panel and baked for 5 minutes at 400° F. The oil film gave the softest and poorest film. The mixture of polymerized oil and polymer was better, and the varnish film was the best of the series. This experiment again clearly indicates the unique nature of the products obtained by our discovery.

A Clay Tower polymer commercially available from The Standard Oil Company and identified as C. T. L. A. polymer has been used as the resin constituent in a number of our varnishes. This material has the following characteristics:

| | |
|---|---|
| Gravity, A. P. I. at 60° | 10.8 |
| Viscosity, S. S. U. at 210 | 213 |
| Flash C. O. C., ° F | 225 |
| Iodine number (Wijs) | 295 |
| Non-volatile matter, ASTM wt. per cent | 87.8 |
| Color, Gardner [1] | 10 |

[1] 1 gram sample diluted with 67 ml. xylene.

EXAMPLE XII

A 20-gallon oil length mixture was prepared from 300 g. of C. T. L. A. polymer, 496.2 g. blown linseed oil ($Z_3$ body) and 341.5 g. mineral spirits. 3.98 g. of 43% aqueous fluoboric acid was diluted with methoxyethanol to 15.92 grams and the diluted catalyst was added at 80° F. to the above mixture which had an initial Ford cup viscosity of 50 seconds. After 4 hours, the viscosity was 3 minutes and 28 seconds, at which point a methanol solution of potassium hydroxide was added to stop the reaction. After the addition of thinner and lead, cobalt and manganese drier, the product of Example XII air dried overnight to give a hard film with good flexibility.

With the same drier content, C. T. L. A. polymer alone or a blend of C. T. L. A. polymer and blown linseed oil in the proportions used in the varnish of Example XII gave very tacky films on air drying. For purposes of comparison of baked films, drier was added to the C. T. L. A. polymer and to the blend, and after thinning, the respective solutions were poured on the same steel panel along with a portion of the varnish of Example XII and the films were baked for 5 minutes at 400° F. The varnish gave a hard, flexible film, the C. T. L. A. polymer gave a hard, brittle film, and the blend gave an unconverted wet film.

A non-volatile content of 66.9% was obtained for the starting mixture of Example XII, and a value of 66.5% was found for the finished varnish, indicating essentially no conversion of the original volatile constituents of the C. T. L. A. polymer. This volatile fraction can be conveniently removed by familiar procedures such as vacuum and/or steam stripping. In fact, there are often cases where it is advantageous to use a resin which has a volatile content directly with the blown oil and strip the finished varnish after catalytic treatment rather than attempting to remove the volatile fraction before reaction. Where further polymerization of the resin or polymerization of the resin with the blown oil are factors in the process of making a varnish by the disclosed procedures, stripping the resin for volatile constituents may result in the loss of reactive materials which could contribute to the yield of film-forming product upon catalytic treatment. Where the varnish is to be heat converted, a volatile contamination may cause no concern because it can be driven off or evaporated by the thermal converting treatment. It may give concern, however, where the varnish is to be air dried. The desirability of removing volatile resin constituents (if present) must be considered on an individual basis and depends on the nature of such volatiles and the end use of the varnish.

A mixture of 300 grams of C. T. L. A. polymer, 496.2 grams of alkali-refined linseed and 341.5 grams of mineral spirits (which corresponds to the composition of the varnish of Example XII from the standpoint of resin, oil and solvent content) was treated with twice the amount and type of catalyst and under conditions which duplicated those of Experiment XII insofar as was possible. It was found that the mixture did not change in viscosity in 41 hours. When this experiment using an oil which was not blown was repeated with 2% of the ether complex of boron trifluoride, there was no change in viscosity.

In no sense is it to be implied that our invention is limited by the requirement that the resin be capable of further polymerization either alone or with the blown oil, in the absence of our catalysts. In many cases polymerization may be a part of the mechanism but in other compositions there is considerable doubt as to the nature of the processes involved. A similar lack of knowledge exists toward conventional varnishes made by thermal treatment of oils and resins. When a 300-gram sample of Petropon 1158 having an initial viscosity of 56 seconds at 71° F. was treated with 3% of the diethyl ether complex of boron trifluoride, the temperature increased slightly and some small amount of solid materials separated; however, the bulk of the resin had a viscosity of 46 seconds at 77° F. after standing 24 hours indicating slight, if any, change. When 100 grams of blown linseed was then added to the resin-catalyst mixture, the viscosity increased from 1 minute and 48 seconds to 3 minutes and 15 seconds in 2 hours, proving that the catalyst had not been deactivated by any variable or condition of the experiment. This experiment had the same catalyst-resin ratio as Example I. On the other hand, experiments as outlined in Example XI indicate that mixtures of a polymerized blown oil and the resin are not the same as the product obtained when both are present during the action of the catalyst.

EXAMPLE XIII

*39 gallon oil length varnish*

| | Grams |
|---|---|
| 100% phenolic formaldehyde resin, Bakelite BR-4036 | 300 |
| Blown linseed oil, $Z_3$ body | 945 |
| Mineral spirits | 1230 |

The above mixture having a non-volatile content of approximately 50% had a viscosity of B. Twenty-five minutes after the addition of 9 grams of boron trifluoride in 15 grams of methoxyethanol, the viscosity was G–H. The reaction was terminated by adding 9 grams of calcium hydroxide. The final color was 5. The product would air dry.

EXAMPLE XIV

| | Grams |
|---|---|
| Petropon 1158 | 750 |
| Blown soyabean oil, $Z_4$ body | 250 |

This mixture had an original Ford Cup viscosity of 1 minute and 21 seconds. Addition of 7.5 grams of the diethyl ether complex of boron trifluoride increased the viscosity to 4 minutes and 28 seconds in about 18 hours. When heat-converted, the films were almost identical to those obtained under the same baking conditions from the product obtained by substituting blown linseed oil for the blown soyabean oil of the example.

EXAMPLE XV

A quantity of tung oil was blown with air in a kettle at 170° F. until a product having a viscosity of M–N was obtained. This oil was used in the following formula:

| | Grams |
|---|---|
| Blown tung | 310 |
| Ester gum | 190 |
| Mineral spirits | 215 |
| Borontrifluoride, ether complex | 4 |

The catalyst, dissolved in twice its weight of methoxyethanol, was added to a mixture of the first three ingredients at 68° F. The mixture went from an initial viscosity of E to a value of K in 6.5 hours. The maximum temperature was 84° F. The process was terminated by adding 2.38 grams of potassium hydroxide dissolved in 4.76 grams of methanol. After the addition of lead, cobalt and manganese drier, a film of the varnish was set to touch in 45 minutes and dry in about one hour. The dried film showed checking.

EXAMPLE XVI

Another sample of tung oil was blown with air at 220° F. to give a product having a viscosity of W. When this blown tung was used in a composition identical to that of Example XV and treated with the same amount of catalyst, the viscosity increased to a value of R in 7.5 hours. The process was terminated by washing with water and the oil phase was separated and dried. The varnish, with added drier, gave dried films which did not show the checking found in Example XV.

EXAMPLE XVII

The blown tung oil described in Example XVI was used in the following composition:

| | Grams |
|---|---|
| Blown tung oil (W viscosity) | 175 |
| Ester gum | 55 |
| Mineral spirits | 98 |
| Anhydrous aluminum trichloride | 11.5 |

The aluminum trichloride, slurried in an equal weight of carbon tetrachloride, was added to the first three ingredients at 74° F. and the resulting mixture was warmed to 100° C. The original viscosity was C and after 7.5 hours a body of J–K was obtained. The process was stopped by washing with water. The varnish, with added drier, was set in 10 minutes and was dry in one hour.

EXAMPLE XVIII

The following composition was treated with 1.03 grams of the ether complex of boron trifluoride diluted with 2.06 grams of methoxyethanol.

| | Grams |
|---|---|
| Damar, Singapore No. 1 bold | 100 |
| Blown, linseed, $Z_3$ body | 315 |
| Xylene | 177 |

The original viscosity was P and the original color was 3–4L. After 3.5 hours at a maximum temperature of 89° F., the action of the catalyst was stopped by adding 0.614 gram of potassium hydroxide in 2.45 grams of methanol. The final product had a viscosity of X–Y and a color of 4. With added drier the films were set in one hour and had a slight tack after two hours. When 4.15 grams of aluminum chloride was used as a catalyst, the same composition reached a viscosity of T in 19 hours at room temperature. When alkali refined linseed was substituted for blown linseed, treatment with 4.15 grams of boron trifluoride produced some darkening but no increase in viscosity was obtained in 7 hours.

EXAMPLE XIX

*40 gallon oil length varnish*

|  | Grams |
|---|---|
| Ester gum | 100 |
| Blown linseed, M body | 320 |
| Mineral spirits | 105 |

The above mixture was treated with 2.1 grams of the diethyl ether complex of borontrifluoride at 75° F. After addition of the catalyst, the temperature increased to 90° F. The original viscosity of the mixture was E and after 5 hours' contact with the catalyst the viscosity was K-L. An additional 2.1 grams of the ether complex was added at 5½ hours, producing the viscosity of P one hour later. After 24 hours, the viscosity was S. The catalyst was neutralized with potassium hydroxide to give a clear, dark varnish which air dried with lead, cobalt and manganese drier.

Examination of the foregoing examples and discussion indicates that practice of the disclosed invention will not only yield new and useful products but leads to results which are completely unexpected. No satisfactory explanation can be offered for the improved solvent resistance of baked films found when the catalyst was neutralized with alkali. While it has been shown that in the case of non-conjugated oils successful results depend on the previous oxidation of the oil, it is equally important that a catalyst be employed and in the fashion described. Products obtained by the disclosed process are markedly different from those obtained by thermally treating the blown oil and resin, by simply mixing the blown oil and resin or by mixing a polymerized blown oil and resin.

Successful utilization of the process which we have described requires that fatty oil constituents of the varnish be oxidized. However, when oils are blown and as the viscosity increases, a point is reached where the product is too unstable toward gelling to be used in industry. The solubility of the blown oil also decreases. For example, instability and solubility become important with blown linseed at viscosities greater than $Z_6$. Such oils might conceivably be used by conducting the process within a period of time before the blown oil solidifies and becomes useless and by increasing the strength of the solvents used. On the other hand it has been found that the use of oils which are insufficiently blown yields varnishes which tend to be darker in color and lower in viscosity than comparable varnishes prepared from the more highly blown oils. The choice of viscosity of the blown oil introduces an element of control not previously available to the varnish maker and in conjunction with the other variables of the process, i. e., nature of the resin, type of oil, oil-length; concentration and type of catalyst, amount and type of diluent or solvent, etc. provides the means of making varnishes not heretofore available.

Numerous modifications and variations of the processes and procedures disclosed above will be apparent to those skilled in the art from the principles herein set forth.

Varnishes of from about 2 to 50 gallon and higher oil lengths provide a wide range of useful products. Depending on the variables in processing, on the selection of ingredients and on the curing conditions employed, our varnishes are useful as clear or pigmented protective coating compositions or as binders for a variety of materials. When employed as binders they can be applied at 100% solids or in the form of solutions at any desired lower solids content, or they may be emulsified. Such materials as molding sands, glass fibers, textile fibers, comminuted vegetable and/or wood masses and like materials may be bonded with our varnish products to make a variety of products such as metal casting molds or cores, insulating board, acoustic tiles, twines for various tying purposes, structural products such as composition board, and compressed and molded bodies of a multitude of shapes and uses.

A glass fiber twine or cord containing about 0.3% of binder was prepared by passing a cord consisting of 150 threads (each thread being composed of 150 filaments) through a heated bath of a varnish prepared as in Example 1 above, then passing the cord and the varnish it carried into a drying tower maintained at between 670° F. and 680° F. The speed in the tower was about 80 feet per minute. The resulting cord had a satisfactory knot strength. Similar twine was also prepared in like manner using a bath of the varnish in the form of an aqueous emulsion. The binder content of such twines can be varied considerably, as little as 5.5% by weight of the finished twine having been found to yield a twine of satisfactory strength, flexibility, adhesion and other properties.

Glass fiber board has also been prepared from glass filaments and a varnish as prepared in Example I to which iron drier was added. The binder content has been varied from about 2% to 8% with satisfactory results. Such board can be cured by heating at 400° F. up to 550° F. for periods of time between about 1 minute and 15 minutes, the longer times being employed at the lower temperatures.

Inasmuch as some of our varnishes are desirably cured at high temperatures, they are eminently suited for use as binders for glass fiber and other siliceous materials capable of being heated to the desired curing temperatures.

Having described our invention, what we claim is:

1. The process for preparing varnish which comprises: providing a component of blown oil selected from the class consisting of blown drying oils, blown semi-drying oils and mixtures thereof, the oil in said component having had oxygen added thereto by blowing at 180–250° F. in an amount substantially equivalent to that produced by blowing tung oil at the same temperatures to a viscosity of M on the Gardner-Holdt scale; preparing a substantially homogeneous liquid-phase mixture containing said blown oil component and resinous material which is soluble therein; treating said liquid-phase mixture at temperatures between room temperature and the decomposition temperature of any of the blown oil contained therein with a small effective amount to about 5% by weight on the resin of catalyst selected from the group consisting of the Friedel-Crafts catalysts, fluoboric acid and mixtures thereof, until the viscosity of said mixture has been increased as a result of the presence and activity of said catalyst; the quantity of resinous material in said mixture being sufficient to impart varnish characteristics to the treated product.

2. The process as claimed in claim 1 wherein the resinous material is a synthetic resin.

3. The process as claimed in claim 1 wherein the resinous material is an unsaturated hydrocarbon resin.

4. The process as claimed in claim 1 wherein the resinous material is a synthetic phenolic resin.

5. The process as claimed in claim 1 wherein the resinous material is a pine resin.

6. The process as claimed in claim 1 wherein the resinous material is a natural resin.

7. The process as claimed in claim 1 which includes the further step of neutralizing the catalyst.

8. The process as claimed in claim 1 which includes the further step of washing the catalyst from the treated mass of material.

9. The varnish product resulting from the process of claim 7.

10. The varnish product resulting from the process of claim 1.

(References on following page)

References Cited in the file of this patent

UNITED STATES PATENTS

| Number | Name | Date |
|---|---|---|
| 2,178,604 | Novak | Nov. 7, 1939 |
| 2,260,417 | Whiteley | Oct. 28, 1941 |
| 2,347,923 | Oswald | May 2, 1944 |
| 2,351,545 | Reineck et al. | June 13, 1944 |
| 2,373,866 | Ward | Apr. 17, 1945 |
| 2,397,179 | Wolfe | Mar. 26, 1946 |
| 2,417,327 | Scott | Mar. 11, 1947 |
| 2,440,000 | Berger | Apr. 20, 1948 |
| 2,550,961 | Bradley | May 1, 1951 |